(12) United States Patent
Dallas

(10) Patent No.: US 10,801,228 B1
(45) Date of Patent: Oct. 13, 2020

(54) FLOOD PROTECTION DEVICE

(71) Applicant: Tyrone Dallas, Houston, TX (US)

(72) Inventor: Tyrone Dallas, Houston, TX (US)

(*) Notice: Subject to any disclaimer, the term of this patent is extended or adjusted under 35 U.S.C. 154(b) by 0 days.

(21) Appl. No.: 16/351,913

(22) Filed: Mar. 13, 2019

(51) Int. Cl.
*E04H 9/16* (2006.01)
*E04H 9/14* (2006.01)
*E04H 15/46* (2006.01)

(52) U.S. Cl.
CPC .............. *E04H 9/145* (2013.01); *E04H 15/46* (2013.01)

(58) Field of Classification Search
CPC ........... B60J 11/00; B60J 11/04; B65D 85/68; B65D 2585/6587; B65D 2585/6865; E04H 15/34; E04H 15/54; E04H 15/56; E04H 15/64
USPC ............... 150/166; 206/335, 320; 383/121.1; 135/87, 115, 116, 119, 157
See application file for complete search history.

(56) References Cited

U.S. PATENT DOCUMENTS

| | | | | | |
|---|---|---|---|---|---|
| 1,472,651 | A | * | 10/1923 | Holling | B60J 11/00 296/138 |
| 1,778,815 | A | * | 10/1930 | Scrivner | E04H 15/003 135/87 |
| 1,828,147 | A | * | 10/1931 | Kamman | A47K 3/325 135/141 |
| 2,847,017 | A | * | 8/1958 | Drago | E04H 15/64 135/157 |
| 2,922,653 | A | * | 1/1960 | O'Brien | A63B 63/00 473/197 |
| 2,928,405 | A | * | 3/1960 | Lawson | E04H 15/003 135/95 |
| 2,931,373 | A | * | 4/1960 | Larson | E04H 15/56 135/90 |
| 3,080,568 | A | * | 3/1963 | Burnett | A47K 3/325 4/602 |
| 3,114,377 | A | * | 12/1963 | Clement | E04H 15/40 135/160 |
| 3,230,962 | A | * | 1/1966 | Hoiness | A01K 97/22 135/148 |
| 3,702,617 | A | * | 11/1972 | Franzen | B60P 3/38 135/88.18 |
| 3,889,698 | A | * | 6/1975 | Roessl | E04H 15/28 135/94 |
| 4,072,158 | A | * | 2/1978 | O'Brien | E04H 15/00 135/116 |
| 4,077,418 | A | * | 3/1978 | Cohen | E04H 15/48 135/118 |
| 4,315,535 | A | * | 2/1982 | Battle | B60J 11/00 150/166 |

(Continued)

*Primary Examiner* — Kyle J. Walraed-Sullivan
(74) *Attorney, Agent, or Firm* — Sanchelima & Associates, P.A.; Christian Sanchelima; Jesus Sanchelima

(57) ABSTRACT

The present invention discloses a flood protection device. The device comprises at least one base, at least one telescoping pole installed in each corner of base, a heavy duty flexible material bag to cover at least one item placed on base and at least one locking unit comprising locking seal and button lock to seal bag. To cover the item using the device, first the item is placed on base. Then the poles are installed on the base to support the bag. After covering the item using bag, the locking seal and button lock are closed to seal the bag. The height of poles are adjustable to create sufficient space for item to be placed. The bag protects the item placed inside the device from flood and avoids any damage of it during flood and storm.

7 Claims, 4 Drawing Sheets

(56) References Cited

U.S. PATENT DOCUMENTS

| | | | | |
|---|---|---|---|---|
| 4,605,030 A * | 8/1986 | Johnson | E04H 6/04 | 135/117 |
| 4,655,236 A * | 4/1987 | Dorame | E04H 6/025 | 135/88.06 |
| 4,683,901 A * | 8/1987 | Mitchell | E04H 6/00 | 114/263 |
| 4,763,783 A * | 8/1988 | Talbot | B64F 1/005 | 150/166 |
| 4,909,044 A * | 3/1990 | Gudmundsen | B60H 1/00007 | 165/43 |
| 4,934,396 A * | 6/1990 | Vitta | E04H 1/1277 | 135/139 |
| 4,975,992 A * | 12/1990 | Patterson | A47K 3/325 | 4/599 |
| 5,190,089 A * | 3/1993 | Jackson | D06F 39/001 | 150/165 |
| 5,241,977 A * | 9/1993 | Flores | B60J 11/00 | 135/119 |
| 5,429,406 A * | 7/1995 | Huang | B60J 11/00 | 150/166 |
| 5,511,254 A * | 4/1996 | O'Brien | A61H 33/06 | 135/157 |
| 5,579,794 A * | 12/1996 | Sporta | E02D 5/801 | 135/88.01 |
| 5,740,826 A * | 4/1998 | Nevin | E04H 6/04 | 135/133 |
| 5,746,237 A * | 5/1998 | Arnic | E04H 6/04 | 135/133 |
| 5,908,043 A * | 6/1999 | Paes | E04B 1/92 | 135/115 |
| 5,941,593 A * | 8/1999 | McCann | B60J 11/02 | 296/136.1 |
| 5,954,200 A * | 9/1999 | Allain | B60J 11/00 | 206/335 |
| 6,012,253 A * | 1/2000 | Burns | B65D 11/1873 | 220/4.34 |
| 6,035,874 A * | 3/2000 | Po-Chang | B60J 11/00 | 135/131 |
| 6,059,105 A * | 5/2000 | Allain | B60J 11/00 | 150/166 |
| 6,129,408 A * | 10/2000 | Schultz | B60J 11/00 | 150/166 |
| 6,273,113 B1 * | 8/2001 | Streyckmans | B60J 11/00 | 135/88.13 |
| 6,276,381 B1 * | 8/2001 | O'Brien | B60J 11/02 | 135/115 |
| 6,405,862 B1 * | 6/2002 | Allain | B60J 11/00 | 150/166 |
| 6,517,141 B1 * | 2/2003 | Su | B60J 11/00 | 150/166 |
| 7,170,010 B1 * | 1/2007 | Yapp | H02G 3/081 | 174/135 |
| 7,172,234 B2 * | 2/2007 | Chang | F16B 7/1445 | 135/88.08 |
| D625,025 S * | 10/2010 | Colmore-Williams | D25/56 | |
| 8,640,395 B2 * | 2/2014 | DiSabantonio, III | E04C 2/322 | 52/79.5 |
| 9,010,348 B1 * | 4/2015 | Kite | E04H 6/04 | 135/88.06 |
| 9,499,035 B1 * | 11/2016 | Chashchukhin | B60J 11/04 | |
| 9,926,715 B1 * | 3/2018 | Morrison | E04H 6/04 | |
| 2003/0071480 A1 * | 4/2003 | Hsiang | B60J 11/00 | 296/136.05 |
| 2005/0000834 A1 * | 1/2005 | Clive-Smith | B65D 88/005 | 206/335 |
| 2005/0139300 A1 * | 6/2005 | Harmon | B60J 11/00 | 150/166 |
| 2005/0166478 A1 * | 8/2005 | Chen | B65D 11/1866 | 52/79.1 |
| 2005/0247387 A1 * | 11/2005 | Hooker | B62J 19/00 | 150/167 |
| 2006/0011625 A1 * | 1/2006 | Arnold | B65D 85/68 | 220/6 |
| 2006/0137730 A1 * | 6/2006 | Johnson | E04H 15/001 | 135/117 |
| 2006/0137731 A1 * | 6/2006 | Anue | E04H 15/64 | 135/119 |
| 2006/0225822 A1 * | 10/2006 | Chen | B60J 11/00 | 150/166 |
| 2007/0075563 A1 * | 4/2007 | Patrice | B60J 11/00 | 296/136.01 |
| 2007/0176462 A1 * | 8/2007 | Lombardo | B60J 11/00 | 296/136.1 |
| 2007/0272289 A1 * | 11/2007 | Cooper | E04H 15/56 | 135/116 |
| 2007/0284023 A1 * | 12/2007 | Sitarz | B60J 11/00 | 150/166 |
| 2008/0053504 A1 * | 3/2008 | Al-Mutairi | E04H 15/58 | 135/88.06 |
| 2008/0060691 A1 * | 3/2008 | Harker | E04H 15/36 | 135/95 |
| 2008/0187255 A1 * | 8/2008 | Griffin | B60J 11/00 | 383/93 |
| 2009/0008958 A1 * | 1/2009 | Sebera | B60J 11/00 | 296/136.1 |
| 2010/0005557 A1 * | 1/2010 | Cossutti | A44B 19/34 | 2/2.17 |
| 2010/0019532 A1 * | 1/2010 | Hooker | B60J 11/00 | 296/136.1 |
| 2010/0243012 A1 * | 9/2010 | Lindeman | B62B 3/16 | 135/88.02 |
| 2012/0216844 A1 * | 8/2012 | DiSabantonio, III | E04H 6/02 | 135/121 |
| 2013/0276846 A1 * | 10/2013 | Courtney | E04H 15/56 | 135/121 |
| 2013/0312882 A1 * | 11/2013 | Echauz | B65D 65/22 | 150/166 |
| 2014/0014151 A1 * | 1/2014 | Wolfe | E04H 15/36 | 135/94 |
| 2014/0042771 A1 * | 2/2014 | Lo | B60J 11/04 | 296/136.07 |
| 2014/0060714 A1 * | 3/2014 | Komperda | B60J 11/04 | 150/166 |
| 2014/0238455 A1 * | 8/2014 | Majer | B60J 11/00 | 135/88.05 |
| 2015/0075685 A1 * | 3/2015 | Denham | B60J 11/04 | 150/166 |
| 2015/0144169 A1 * | 5/2015 | Hunt | E04H 15/16 | 135/143 |
| 2015/0202952 A1 * | 7/2015 | Karboul | B60J 11/00 | 150/166 |
| 2016/0102474 A1 * | 4/2016 | Ludlow | E04H 15/46 | 135/139 |
| 2016/0251146 A1 * | 9/2016 | Hainer | B65D 85/68 | 53/471 |
| 2016/0339772 A1 * | 11/2016 | Acosta | B60J 11/04 | |
| 2016/0368357 A1 * | 12/2016 | Lerner | B60J 11/04 | |
| 2017/0058555 A1 * | 3/2017 | Tejada | E04H 15/64 | |
| 2017/0065089 A1 * | 3/2017 | Schubiger | A47G 9/0223 | |
| 2017/0088343 A1 * | 3/2017 | Hewlett | B65D 88/14 | |
| 2017/0143127 A1 * | 5/2017 | King-O'Connor | E04H 15/44 | |
| 2017/0298619 A1 * | 10/2017 | Candela Canales | E04B 2/562 | |
| 2017/0341497 A1 * | 11/2017 | Garnick | B60J 11/04 | |
| 2018/0094447 A1 * | 4/2018 | Tester | E04H 15/44 | |
| 2018/0155955 A1 * | 6/2018 | Ferrara | E04H 15/001 | |
| 2018/0220751 A1 * | 8/2018 | Jin | E04H 15/32 | |
| 2018/0334020 A1 * | 11/2018 | Garnick | B60J 11/04 | |
| 2018/0334830 A1 * | 11/2018 | Chiang | E04H 15/425 | |
| 2019/0003194 A1 * | 1/2019 | Aliev | E04H 1/12 | |
| 2019/0100287 A1 * | 4/2019 | Fisher | B63B 22/24 | |
| 2019/0106898 A1 * | 4/2019 | Gorlachev | E04H 6/02 | |
| 2019/0118013 A1 * | 4/2019 | Brubakken | A62C 2/10 | |
| 2019/0177936 A1 * | 6/2019 | Powell | E04H 15/54 | |
| 2019/0203500 A1 * | 7/2019 | LaHood | E04H 15/64 | |
| 2019/0203501 A1 * | 7/2019 | LaHood | E04H 15/18 | |
| 2019/0218809 A1 * | 7/2019 | Pearson | E04H 6/005 | |
| 2019/0233038 A1 * | 8/2019 | Doughty | B62H 3/08 | |

(56) References Cited

U.S. PATENT DOCUMENTS

2019/0330870 A1* 10/2019 May .......................... E04H 6/04
2020/0008594 A1* 1/2020 Novacek ................. E04H 15/56
2020/0157836 A1* 5/2020 Graham ................. E04H 15/64

* cited by examiner

FLOOD PROTECTION DEVICE

BACKGROUND OF THE INVENTION

1. Field of the Invention

The present disclosure relates to a device that protects a variety of items from flood. More particularly, the present disclosure relates to a protective device that covers one or more items inside and prevent flood water entering and damaging items.

2. Description of the Related Art

Protecting and preserving various important, essential and costlier items, such as automobiles, home appliances, furniture and the like are necessary during situations, for example flood and storm. Providing proper sealing of items in a bag/cover is challenging during flood, to avoid damage of such items.

Applicant believes that a related reference corresponds to U.S. Pat. No. 4,315,535 filed by Daniel S. Battle for a flood protection container for vehicles. The DANIEL reference discloses a flood protection apparatus for vehicles which comprises the unitary flexible container, having at least a bottom, and a continuous side wall integrally and sealably connected thereto and extended upward during operation, an upper orifice in the container for receiving a vehicle within, a length of cord housed within a continuous channel on the uppermost end of the sidewall for constricting the orifice of the container after the vehicle has been placed within, at least one marking place on the bottom of the container running its length, and up at least one side of the container for indicating placement of the tires of the vehicle within the container. The walls of the container are collapsible, and the container material would be a multi-layer flexible material, with the outer most and inner most layers being plastic based, and the middle layer being a canvas type material.

Another related application is U.S. Pat. No. 5,190,089 filed by Gary R. Jackson for a protective collapsible bag assembly for appliance items. The GARY reference discloses a collapsible bag assembly is described which provides a barrier for protecting an appliance item against flood water damage. The bag assembly includes a) a water impermeable flexible tube of plastic sheeting which is open at the top and closed at the bottom and b) a plat form base attached to the bottom of the tube. The bag assembly is used by positioning the appliance item on the platform base. During passive periods, the bag assembly is in its collapsed position whereby the tube of plastic sheeting is folded and stored along the edge of the platform base in proximity to the lower part of the appliance item. When it is necessary to protect the appliance item against water contact, the bag assembly is deployed to its extended position by lifting the tube of plastic sheeting from its stored position and extending it toward the top of the appliance item where it is secured until such protection is no longer required.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a device that protects a variety of items from flood. More particularly, the present disclosure relates to a protective device that can covers one or more items such as automobiles, home appliances, furniture and the like, and prevent flood water entering and damaging items.

It is still another object of the present invention to provide a protection device that has a bag into which the item to be protected is covered. Locking unit having zipper lock and button lock are used to completely seal the item to be protected.

It is another object of the present invention to provide a protection device that comprises poles at corner of base of the device to support bag, which is used to cover the item to be protected. The poles are telescopic poles. The height of the poles can be adjusted based on the size of the item to be protected.

It is another object of the present invention to provide a protection device that can be of different size and shape based on size and shape of item to be protected from flood.

It is another object of the present invention to provide a protection device that comprises heavy-duty flexible bag that covers item to be protected. The material of bag can be plastic.

It is another object of the present invention to provide a protection device that can be used conveniently by only one person. To cover and protect item using device, first base with bag is placed on floor, then poles are installed, then item is placed on base and then finally the bag is covered and locked.

It is another object of the present invention to provide a protection device that comprises at least one base, at least one telescoping pole installed in each corner of base, a heavy duty flexible material bag to cover at least one item placed on base and at least one locking unit comprising locking seal and button lock to seal bag. To cover the item using the device, first the item is placed on base. Then the poles are installed on the base to support the bag. After covering the item using bag, the locking seal and button lock are closed to seal the bag. The height of poles are adjustable to create sufficient space for item to be placed. The bag protects the item placed inside the device from flood and avoids any damage of it during flood and storm.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
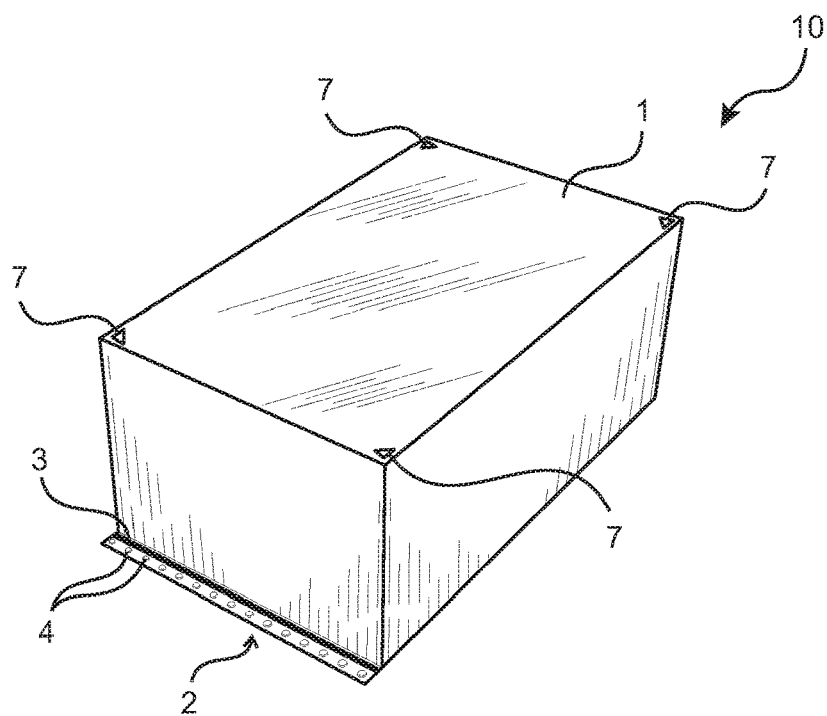
FIG. 1 demonstrates perspective view of fully installed flood protection device 10. The device 10 has bag 1 that covers and protects item placed inside the device 10. Locking unit 2 seals bag 1 and protects item placed inside device from flood.

FIG. 1 demonstrates perspective view of fully installed flood protection device 10. The device 10 has bag 1 that covers and protects item placed inside the device 10. After covering the item using bag 1, it can be sealed/locked using locking unit 2. Locking unit 2 has at least one locking seal 3 and button lock 4. The locking seal 3 seals bag 1 such that water/air do not enter into bag 1. Button lock 4 provides preliminary lock protection to bag. Bag 1 can be completely sealed using locking seal 3. The locking seal 3 can be press type sealing or can be zipper lock without limitation. Button lock 4 can be press type button without limitation. As shown in FIG. 1, without limitation, locking unit 2 can be in at least one side of the bag, such that the bag can be opened sufficient to place the item to be protected. Device 10 uses at least one pole (not shown) to support bag 1 in upright position. Pole holder 7 shown in FIG. 1 holds/supports poles at top, such that bag 1 is held in upright position without allowing bag to fall off.

Figure 2:
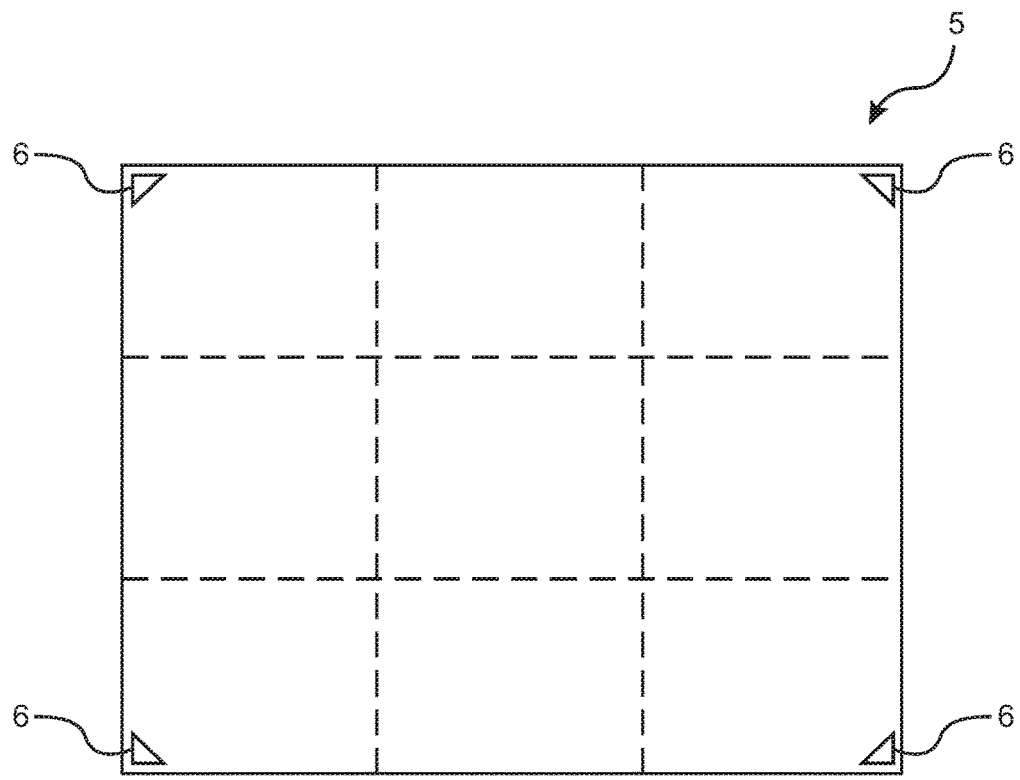
FIG. 2 demonstrates top view of a base 5 of the present invention. On base 5, item to be protected from flood is placed.
Figure 3:
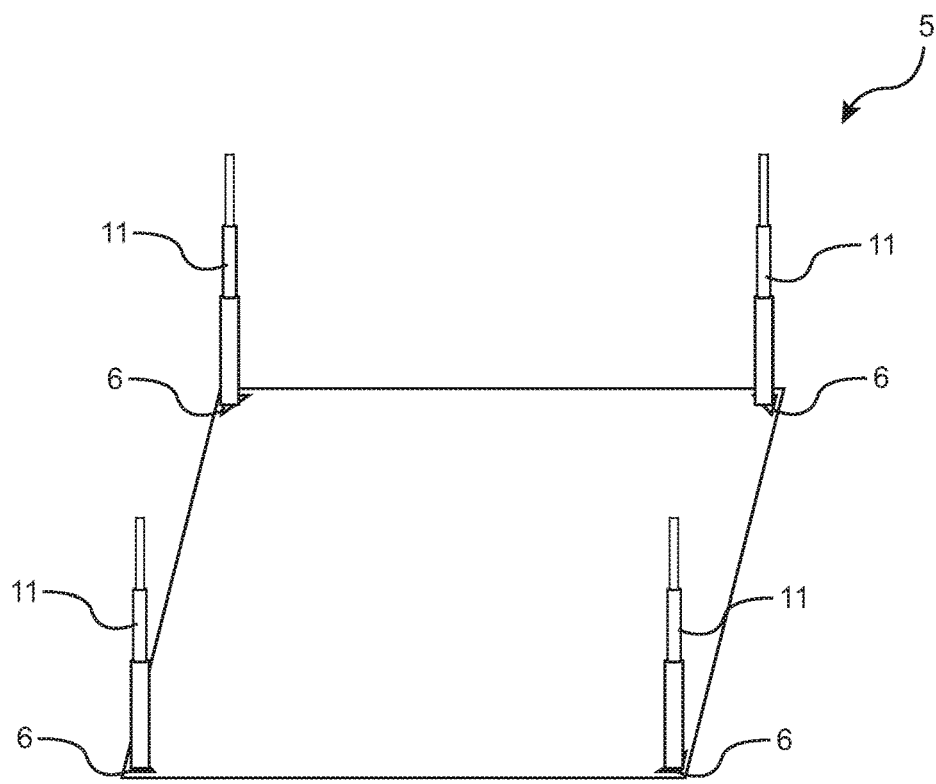
FIG. 3 demonstrates perspective view of present invention showing poles 11 installed on at least one pole holder 6 of base 5 of FIG. 2. Pole holder 6 supports pole 11 at upright position.

FIGS. 2-3 show base 5 of device 10. On base 5, item to be protected from flood is placed. The base 5 has pole holder 6 to support pole 11 in upright position. When device 10 is to be used for flood protection, base 5 can be placed on open floor and then poles can be installed in support holder 6. Then as shown in FIG. 1 the item to be protected is fully covered with the bag 1 and locked using locking unit 2. It should be noted that bag 1 and base 5 can be either independent elements or can be integrally formed. Proper sealing and connections are provided between each elements, such that entire device remains air tight to prevent water entering device. The bag is a light weight, flexible, watertight and heavy duty rectangular enclosure that provides water-damage protection during flooding. The support pole 11 are telescopic poles, hence are adjustable to create sufficient space for item to be placed. Adjusting height of poles 11 also allows items of various size and shape to be placed inside device 10. The bag 1 protects the item placed inside the device 10 from flood and avoids damage.

Figure 4:
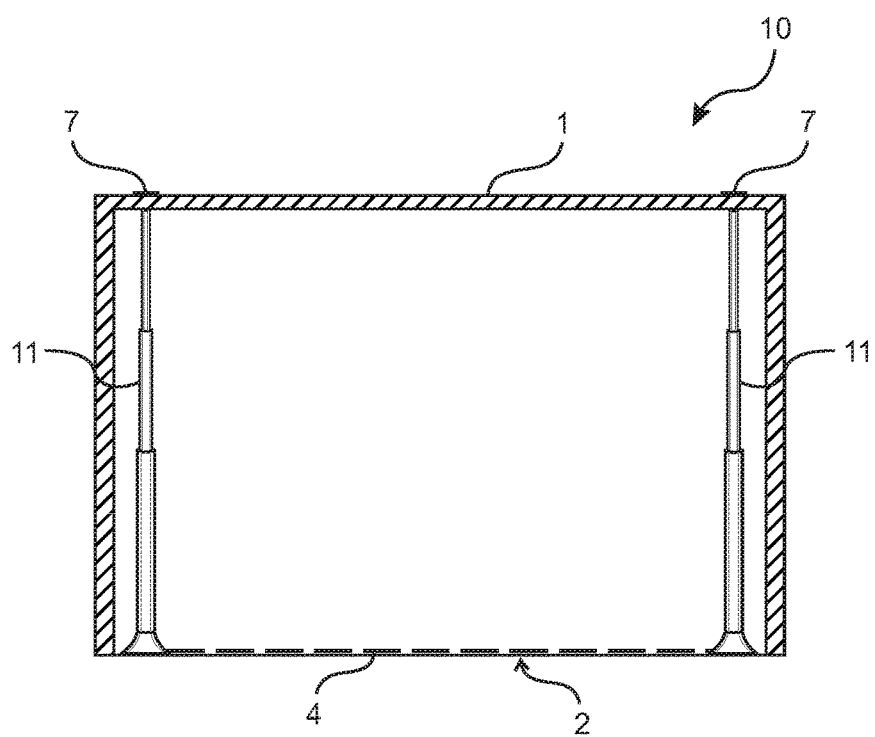
FIG. 4 shows a side end view of device 10 of FIG. 1, showing poles 11, bag 1 and locking unit 2.

FIG. 4 shows a side end view of device 10 of FIG. 1, showing poles 11, bag 1 and locking unit 2, after installing poles 11 and covering item using bag 1. As shown in FIG. 4, the poles 11 are supported at top using pole holder 7. Pole holder 7 not only holds poles in upright position but also retains the bag 1 without shifting or moving or shedding off.

Figure 5:
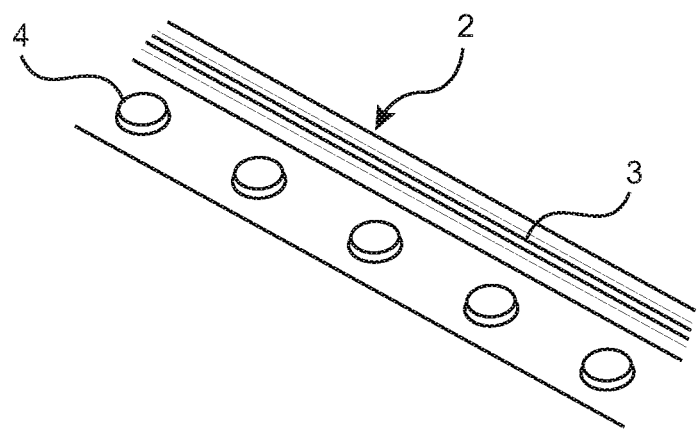
FIG. 5 is an enlarged view of locking unit 2 of present invention. The locking unit 2 has locking seal 3 and button lock 4.

FIG. 5 is an enlarged view of locking unit 2 of present invention. The locking unit 2 has locking seal 3 and button lock 4. The locking unit 2 seals the device 10 and protects item placed inside device 10 from flood. As the present invention seals the item to be protected, it can not only be used to protect from flood but also prevent exterior damage by storm and/or debris. After covering the item using bag 1, the locking seal 3 and button lock 4 are closed to seal the bag 1.

Figure 6:
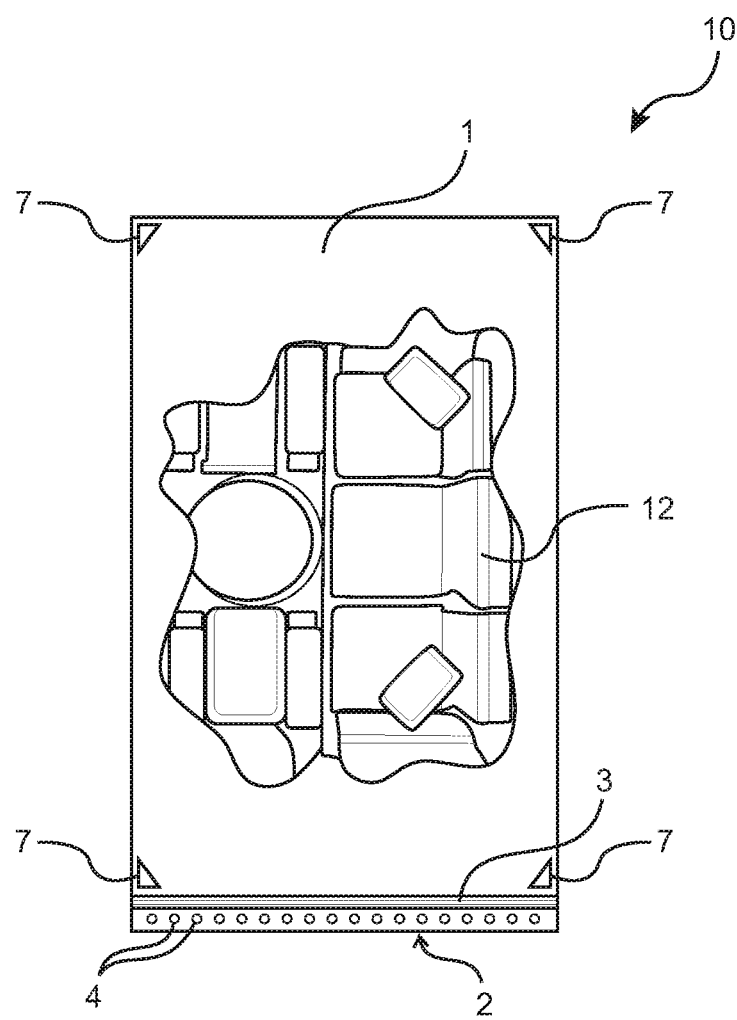
FIG. 6 shows a top partial cut away view of device 10 of FIG. 1 showing furniture item 12 placed inside the bag 1 to protect from flood.
Figure 7:
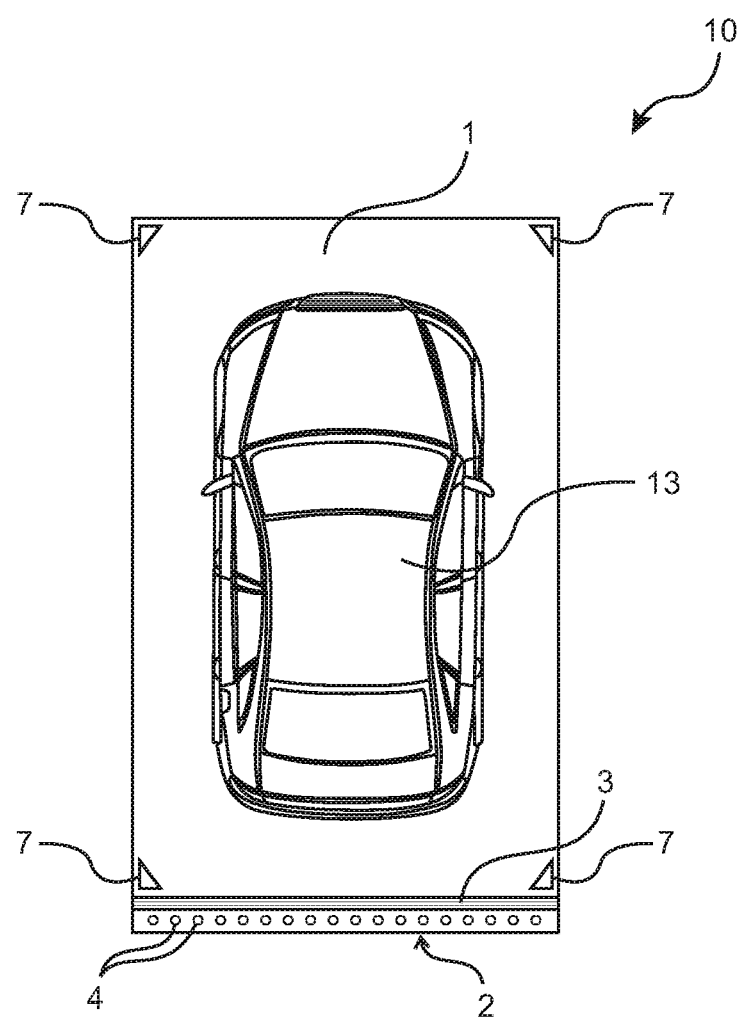
FIG. 7 shows top inside view of device 10 protecting car 13 inside bag 1.

FIG. 6 shows a top partial cut away view of device 10 of FIG. 1 showing furniture item 12 placed inside the bag 1 to protect from flood. FIG. 7 shows top inside view of device 10 protecting car 13 inside bag 1. In case of any flood alert or in case we are going for a long vacation, the items such as automobiles, home appliances, furniture and the like can be covered using device 10. This protects the item which may get dust over time.

The present invention provides an effective way to protect a variety of items, including furniture such as beds, couches, tables and televisions, large and small kitchen appliances such as refrigerators, stoves, dish washers and microwaves, automobiles, and anything that is important and needs to be protected from damaging flood waters. The present invention also prevent exterior damage from storm debris. The device is easy to assemble, need only one person to install and cover item. Further the device is also convenient and easy to use. Helps to prevent damage to seats, wiring, electronics and engine of vehicle, in case of flood. The device is portable and can be producible in different sizes. To cover item in device, first base with opened bag is placed on floor, then poles are installed, then item is placed on base and then finally the bag is locked. The present invention can be used in marketing outlets not limited to, such as automotive stores, department stores, discount department stores, hardware stores, to prevent various items form water damage.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A flood protection device to protect an item from flood, comprising:
   at least one base having a rectangular shape, said at least one base having a pole holder located at each corner, wherein said item is placed on said at least one base;
   at least one pole installed in each corner of said at least one base on said pole holder, wherein said at least one pole creates a space for said item;
   a bag to cover said item placed on said at least one base, wherein said at least one pole supports said bag, said bag having a top end having a rectangular shape, said top end having a pole holder located at each corner thereof to receive a top end of said at least one pole; and
   at least one locking unit located along an outer edge of said base to seal said bag, said locking unit including a locking seal and a plurality of button locks, said locking seal extending the entire length of said outer edge, a rectangular portion provided in front of said locking seal, said rectangular portion having said plurality of button locks mounted thereon, wherein said item comprises at least one of paper documents, electrical and electronic devices, an automobile, home appliances or furniture.

2. The flood protection device of claim 1, wherein said at least one locking unit prevents water from entering said bag.

3. The flood protection device of claim 1, wherein said at least one pole is a telescoping pole.

4. The flood protection device of claim 1, wherein a height of said at least one pole are telescopic height adjustable poles.

5. The flood protection device of claim 1, wherein said bag is made of a flexible material.

6. The flood protection device of claim 1, wherein said locking unit is located entirely below said top end of said bag.

7. The flood protection device of claim 1, wherein said locking seal is provided as a press seal or a zipper lock.

* * * * *